United States Patent Office 3,160,039
Patented Dec. 8, 1964

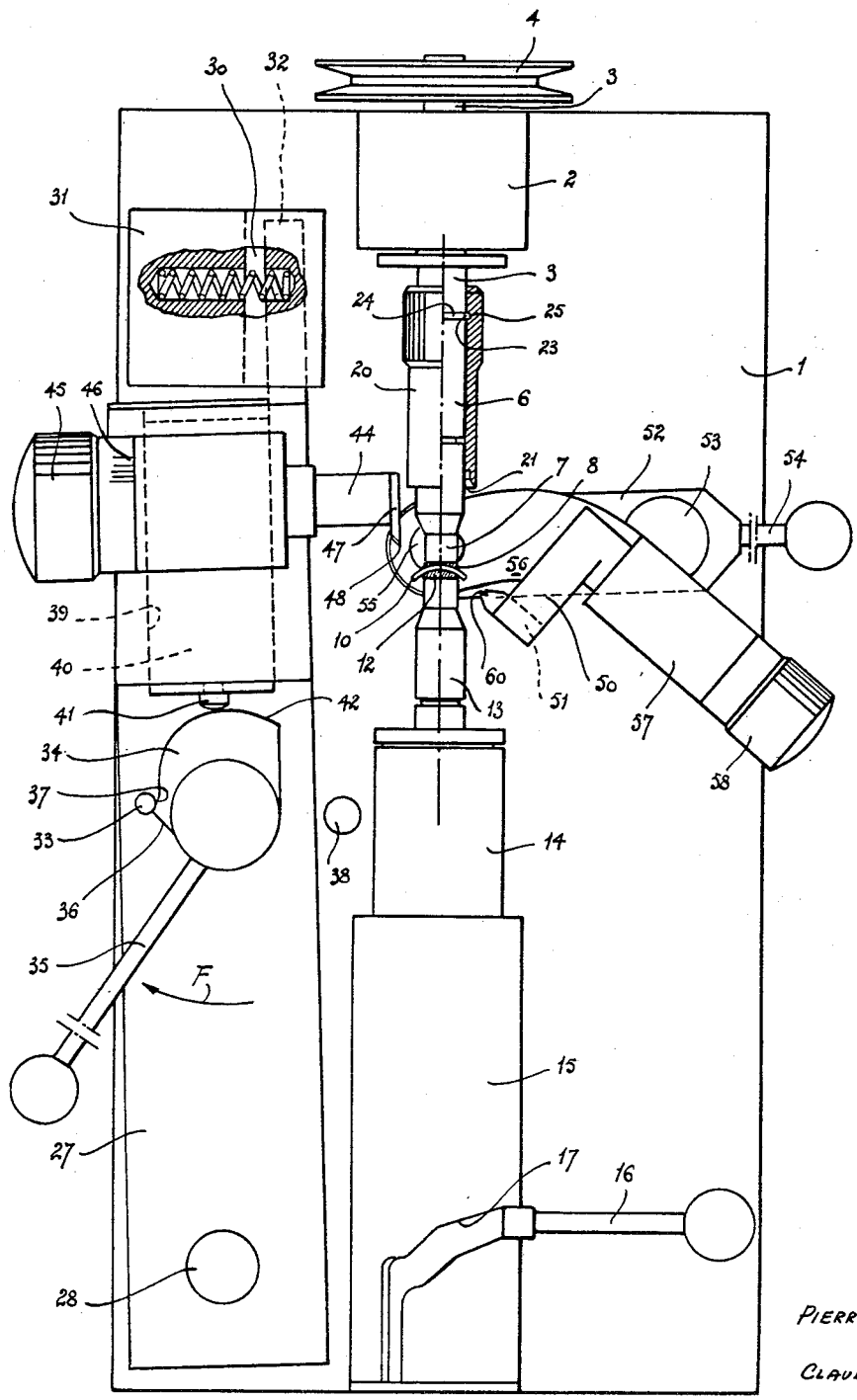

3,160,039
MANUFACTURING OF CORNEAL LENSES
Pierre Michel Rocher and Claude Gabriel Thomas, Saint-Maur, France, assignors to Lentilles Ophtalmiques Rationnelles, Seine, France, a corporation of France
Filed Jan. 12, 1962, Ser. No. 165,875
Claims priority, application France, Mar. 20, 1961, 856,114
6 Claims. (Cl. 82—13)

This invention relates to the manufacture of corneal lenses, and in particular to processes for rough turning and then finishing the rims of such lenses, as well as machines for carrying out the process.

Experience has shown that in the case of corneal lenses the rim of the lens plays a very important part in determining the tolerance of the lens. This rim must have a perfect profile which can be faithfully reproduced. In fact, should anyone break or lose a lens, a laboratory should be able to supply a replacement absolutely identical to the original.

The manual means usually employed does not permit such fidelity of reproduction.

Moreover according to the dioptric strength of the lens considered, the rim of the lens is more or less thick according to the initial sizing of the diameter of the lens. Whatever the thickness of the rim, a rim profile giving maximum comfort to the eye must be obtained.

Here again the usual manual processes are unsatisfactory. Those manual processes based on working to radius are unsatisfactory because the point of tangential connection is very difficult to determine. One can, besides account for the imperfection of the rim obtained by projection on a profile controller.

It is a main object of the present invention to provide a finishing process for finishing the rim of the lens which eliminates these various difficulties and assures the obtaining of an easily reproducible lens rim well adapted to be comfortable to the wearer.

According to the invention there is provided a process for finishing the rim of a corneal lens wherein a lens to be machined is rotated about its axis, then during a first machining operation the lens is reduced to a diameter slightly greater than its final diameter, and finally the section of the rim of the lens is given a desired profile by removing surplus material by means of an edge cutting tool, the cutting profile of which is exactly complementary to the desired profile for the rim of the lens.

In using this tool therefore, the profile is determined once and for all, and it is easy to produce in a single operation a lens rim which can be readily tolerated by the eye.

The chosen profile of the rim is determined experimentally to give the wearer maximum comfort, and is then reproduced, naturally concave in shape, by cutting tools.

The invention also comprehends a machine by means of which this process can be carried out easily.

A machine according to the invention comprises in combination, on a common bed plate, a lens carrying spindle adapted to be rotated, and respectively mounted on either side of the spindle, a movable carriage carrying a roughing tool arranged to be displaced parallel to the axis of the spindle at a regulated distance therefrom, and a support for an edge cutting tool the cutting profile of which reproduces the desired profile to be given to the rim of the lens, and means for controlling the graduated displacement of the cutting tool and its inclination as a function of the curvature of the lens being machined.

This machine thus groups together means for enabling the lens to be machined to be finished simply in two operations without demounting or replacing this lens.

In order that the invention may be more clearly understood, an embodiment thereof will now be described, by way of example, with reference to the accompanying drawing which shows in plan a machine according to the invention.

The machine, according to the invention, illustrated in the drawing comprises a rectangular horizontal bed plate 1 carrying at one end in the middle of one of its smaller sides, a block 2 forming a bearing for a shaft 3 parallel to the longitudinal axis of the bed plate. One end of this shaft 3, extending beyond the support 1, carries a driving pulley 4 coupled by a belt, not shown, to a motor likewise not shown. The other end of the shaft 3 comprises a cylindrical part 6 which is terminated by part 7 of lesser diameter provided at its end with a small cup 8 of rubber or similar pliable material, adapted to receive the convex face of a corneal lens 10 to be machined.

This lens 10 is maintained in position in the cup 8 by pressure from a buffer pad 12 also of rubber or similar pliable material fixed at the end of a rod 13 disposed in the extension of the shaft 3 and mounted for rotation on a cylinder 14 sliding in a sheath 15, the sheath 15 being fixed to the bed plate 1. The cylinder 14 can be moved close to or away from the lens by the action of a radial lever 16 integral with the cylinder 14 and co-operating with a slanting slot 17 in the said sheath 15.

A centering sleeve 20 is arranged to slide on the cylindrical part 6 of the shaft 3 and the end of the sleeve 20 facing the lens 10 is formed with a truncated bore 21 adapted to receive and center the lens 10 to be machined.

In order to place the lens in position, the cylinder 14 being retracted and the sleeve 20 being moved until it extends over to the cup 8, it is sufficient to center the lens 10 in the bore 21, then to bring the buffer pad 12 into contact with the lens and to move back the assembly of the sleeve 20, the lens 10, and the buffer pad 12 in the direction of the cup 8 until the lens contacts the cup 8. The lens 10 is thus perfectly centered in relation to the shaft 3 and the sleeve 20 may be retracted towards the support 2, into a rest position in which it is locked by means of an open spring 23 which engages simultaneously in an interior circular groove 24 in the sleeve and a circular peripheral groove 25 in the shaft 3.

The machine comprises further a support plate 27 mounted to pivot about a vertical axis 28 situated in the neighborhood of the smaller side of the table 1 opposite to the small side carrying the block 2. The pivot 28 is located between a longitudinal edge of the table 1 and the sheath 15. This support plate 27, which is shaped, in plan, in the form of an elongated rectangle, is movable between a working position, towards which it is thrust by the action of a compressed spring 30 extending between a fixed support block 31 and an arm 32 fixed to the free end of the said support plate 27, this working position, in which the longitudinal edges of support plate 27 are substantially parallel to the axis of shaft 3, being defined by the abutment of one of these edges against an abutment 38 carried by the bed plate 1, and a rest position as shown in the drawing, in which the free end of the support plate 27 is away from the shaft 3, the support plate 27 being maintained in this rest position by the co-operation of an abutment 33 carried by the support plate 27 with the peripheral surface of a cam 34 mounted so as to pivot on a vertical axis on the frame and extending through the support 27 by a suitable opening (not shown). This cam 34 is fixed to an operating lever 35 and comprises a part 36 in the form of a sloping ramp, extended by a depression 37 which rests against the abutment 33 in the rest position of the support. When the lever 35 is swung in the direction shown by arrow F, the abutment 33 moves out of the depression 37 and slides along the ramp 36 enabling the support plate 27 to be pivoted, so that under the action of the spring 30, the plate 27 occupies its working position, abutting against the abutment 38.

At the free end of support plate 27 is fitted a sliding track 39 which receives a tool carriage 40 adapted to slide along the longitudinal axis of the support plate 27.

This carriage is returned by means of a spring, not shown, in the direction of the cam 34, and carries at its end facing that cam, a finger 41 adapted to contact a part 42 of the cam which forms an extension of the ramp 36 from the depression 37 and extends out in an increasing radius from the depression.

The profile of the cam 34 is such that the finger 41 rests on a region of large radius of the part 42 when the abutment 33 is on the depression 37, and the finger 41 slides towards the region of a small radius of the part 42 when the abutment 33 itself slides on to the ramp 36. Thus, at the same time as the support plate 27 swings into the working position, the carriage 40 approaches the center of the said support plate 27.

This carriage 40 receives a tool carrier 44 capable of displacement perpendicularly to the longitudinal axis of support 27, such displacement being controlled by a micrometer operated by a knob 45 of a vernier 46.

This tool carrier is fitted with a cutting tool 47 having a cutting edge 48, this edge being near the lens and arranged so as to come in contact with the rim of the lens and to effect the roughing of the rim as the carriage 40 approaches the center of support plate 27, the latter having previously swung into the working position; the lens is reduced to the desired diameter by regulating the micrometer associated with the tool 47.

The table 1 also carries a support 50 for the radial tool 51, facing the support 27.

This support 50 comprises a swinging plate 52 mounted so as to pivot around a vertical pivot 53 located near the longitudinal edge of bed plate 1 level with the lens to be machined, this plate 52 being equipped with an operating lever 54 arranged outside the table 1. The free end of this plate 52 carries a vertical pivot 55 arranged substantially perpendicular to the lens 10 and on which is pivoted one end of an elbow shaped support stage 56, which carries at its other end a micrometer 57 operated by a knob 58 for moving the support 50 of the tool 51.

The tool 51 is formed, according to one feature of the invention, by a cutting blade in which is formed a notch 60 reproducing in reverse the profile to be given to the rim of the lens 10.

This profile is determined as a result of experiments, and is so designed as to take into consideration the comfort of the wearer of corneal lenses, in order to obtain a good eye tolerance. Having thus obtained a standard rim profile, the blades 51 are machined so that the cutting edge faithfully reproduces this profile.

With a blade 51 mounted in the tool carrier 50, it is possible to bring the cutting edge of this blade into contact with the rim of the lens, by regulating the inclination of the notch 60 as a function of the curvature of the lens, the approach of the blade to the final desired diameter being obtained by means of the knob 58.

A process according to the invention is carried out employing the machine just described which operates as follows:

A semi-finished lens ready to be roughly turned is placed in position and centered between the cup 8 and the buffer pad 12 in the manner described above, making use of the sleeve 20.

Next this lens is rotated and a first rough machining is effected to a diameter slightly exceeding the final diameter by means of tool 47, bringing support plate 27 into the working position and displacing the tool 47 parallel to the axis of the lens solely by the operation of the lever 35. The distance separating the edge 48 of the tool from the axis of the lens is regulated by means of the micrometer operated by the knob 45.

The cutting blade 51 is then brought into the desired axis, dependent on the curvature of the lens, acting at the same time on plate 52 and on the support stage 56, the diameter of the lens being reduced to the desired figure by advancing the tool by means of the device 57.

In this way a profile which faithfully reproduces that of the notch 60 of the tool is given to the rim of the lens, which profile is therefore perfectly adapted to be accepted by the eye.

Where the rim of the lens is particularly thick, the tool 51 can reduce that thickness by being applied to the outer face of the lens over a width of about 1 mm., the depth of the notch 60 being suitably determined.

For lenses of usual power one arranges that when being machined, the profile of the notch 60 is tangential to the convex face of the lens, the concave face being necessarily reformed in order to obtain the supplementary curves. During this latter operation the joining curve will be automatically polished on this concave face.

The invention is of course not limited to the embodiment described, the machine by which the process of the invention may be put into operation being subject to numerous modifications in design having to do in particular with the design of the tool support 50 and of its regulating elements.

We claim:

1. A machine for finishing the rim of a corneal lens, comprising in combination on a common bed plate, a lens carrying spindle mounted on said bed plate, means for rotating said spindle, a movable carriage mounted on one side of the spindle, a roughing tool carried on said movable carriage and arranged to be displaced parallel to the axis of the spindle at a regulated distance therefrom, a tool support mounted on the other side of the spindle, an edge cutting tool carried by said support, said edge cutting tool having a cutting profile which reproduces the desired profile to be given to the rim of the lens, and means mounting the tool support for swinging movement relative to the spindle axis and for rectilinear movement toward and away from the spindle axis.

2. A machine according to claim 1, wherein said mounting means comprises a swinging plate pivotally mounted on said bed plate, a support stage pivotally mounted on said swinging plate, the pivots of the swinging plate and the support stage being spaced apart, and a tool carrier carrying said edge cutting tool mounted on the support, said tool carrier having a micrometer adjustment.

3. A machine for finishing the rim of a corneal lens, comprising in combination on a common bed plate, a lens carrying spindle mounted on said bed plate, means for rotating said spindle, centering means on the spindle for centering a lens with respect to the spindle, a movable carriage mounted on one side of the spindle, a roughing tool carried on said movable carriage and arranged to be displaced parallel to the axis of the spindle at a regulated distance therefrom, a tool support mounted on the other side of the spindle, an edge cutting tool carried by said support, said edge cutting tool having a cutting profile which reproduces the desired profile to be given to the rim of the lens, and means mounting the tool support for swinging movement relative to the spindle axis and for rectilinear movement toward and away from the spindle axis.

4. A machine according to claim 3, wherein said mounting means comprises a swinging plate pivotally mounted on said bed plate, a support stage pivotally mounted on said swinging plate, the pivots of the swinging plate and the support stage being spaced apart, and a tool carrier carrying said edge cutting tool mounted on the support, said tool carrier having a micrometer adjustment.

5. A machine for finishing the rim of a corneal lens, comprising in combination a common bedplate, a lens-carrying spindle mounted on said bedplate, means for rotating said spindle, a movable carriage mounted on one side of the spindle, a roughing tool carried on said movable carriage, means for adjusting the distance between said tool and the axis of said spindle and means for displacing said tool parallel to said axis, a tool support mounted on the other side of the spindle, an edge-cutting tool carried by said support, said edge-cutting tool comprising a cutting edge in which is formed a notch for shaping the rim of the lens, and means mounting the tool support for swinging movement relative to the spindle axis and for rectilinear movement toward and away from the spindle axis.

6. A machine according to claim 5, wherein said mounting means comprises a swinging plate pivotally mounted on said bedplate, a support stage pivotally mounted on said swinging plate, the pivots of the swinging plate and the support stage being spaced apart, and said displacing means comprises a tool carrier carrying said edge-cutting tool mounted on the support, said tool carrier having a micrometer adjustment.

References Cited by the Examiner

UNITED STATES PATENTS

| | | | |
|---|---|---|---|
| 2,109,454 | 3/38 | Becker | 82—18 |
| 2,237,744 | 4/41 | Mullen | 82—1 |
| 2,268,983 | 1/42 | Gilmore et al. | 82—1 |
| 2,714,325 | 8/55 | Junker | 82—18 |

WILLIAM W. DYER, JR., *Primary Examiner.*